United States Patent [19]

Fox

[11] Patent Number: 5,320,432
[45] Date of Patent: Jun. 14, 1994

[54] OSCILLATABLE BEARING ASSEMBLY

[76] Inventor: Frederick A. Fox, 743 Floral Ave., Chambersburg, Pa. 17201

[21] Appl. No.: 950,510

[22] Filed: Sep. 25, 1992

[51] Int. Cl.[5] .............................................. F16C 17/10
[52] U.S. Cl. .................................. 384/110; 74/424.8 R; 74/89.15
[58] Field of Search ................ 74/424.8 R, 89.15; 384/100, 110, 292

[56] References Cited

U.S. PATENT DOCUMENTS

| | | | |
|---|---|---|---|
| 714,941 | 12/1902 | Norris | 384/368 |
| 817,268 | 4/1906 | Norris | 384/286 |
| 1,132,759 | 3/1915 | Bache | 384/292 |
| 1,652,642 | 12/1927 | Shaw | 184/61 |
| 1,674,453 | 6/1928 | Sloper . | |
| 2,381,513 | 8/1945 | Pearson | 384/292 |
| 3,090,244 | 5/1963 | Davis | 74/424.8 R |
| 3,131,977 | 5/1964 | Wirtz | 308/238 |
| 3,147,690 | 9/1964 | Smith | 74/424.8 R |
| 3,259,392 | 7/1966 | Peickii | 277/59 |
| 3,595,100 | 7/1971 | Stark et al. | 74/428.8 R |
| 3,746,415 | 7/1973 | Thomson . | |
| 4,181,378 | 1/1980 | Schmaeng . | |
| 4,748,862 | 6/1988 | Johnston | 74/7 |
| 4,768,479 | 9/1988 | Kammeraad | 123/188 |
| 5,100,114 | 3/1992 | Reuter et al. | 267/293 |

Primary Examiner—Lenard A. Footland
Attorney, Agent, or Firm—Dowell & Dowell

[57] ABSTRACT

A bearing assembly has a load carrying housing subjected to oscillation that has an internal helical thread mating with a threaded load supporting stationary shaft, the threaded elements having seals at their ends for holding lubricant in the clearance space therebetween. In a preferred embodiment, one or more grooves are provided along the housing for the reception of debris and as a reservoir, additional clearance at the ends being provided for a lubricant reservoir.

6 Claims, 2 Drawing Sheets

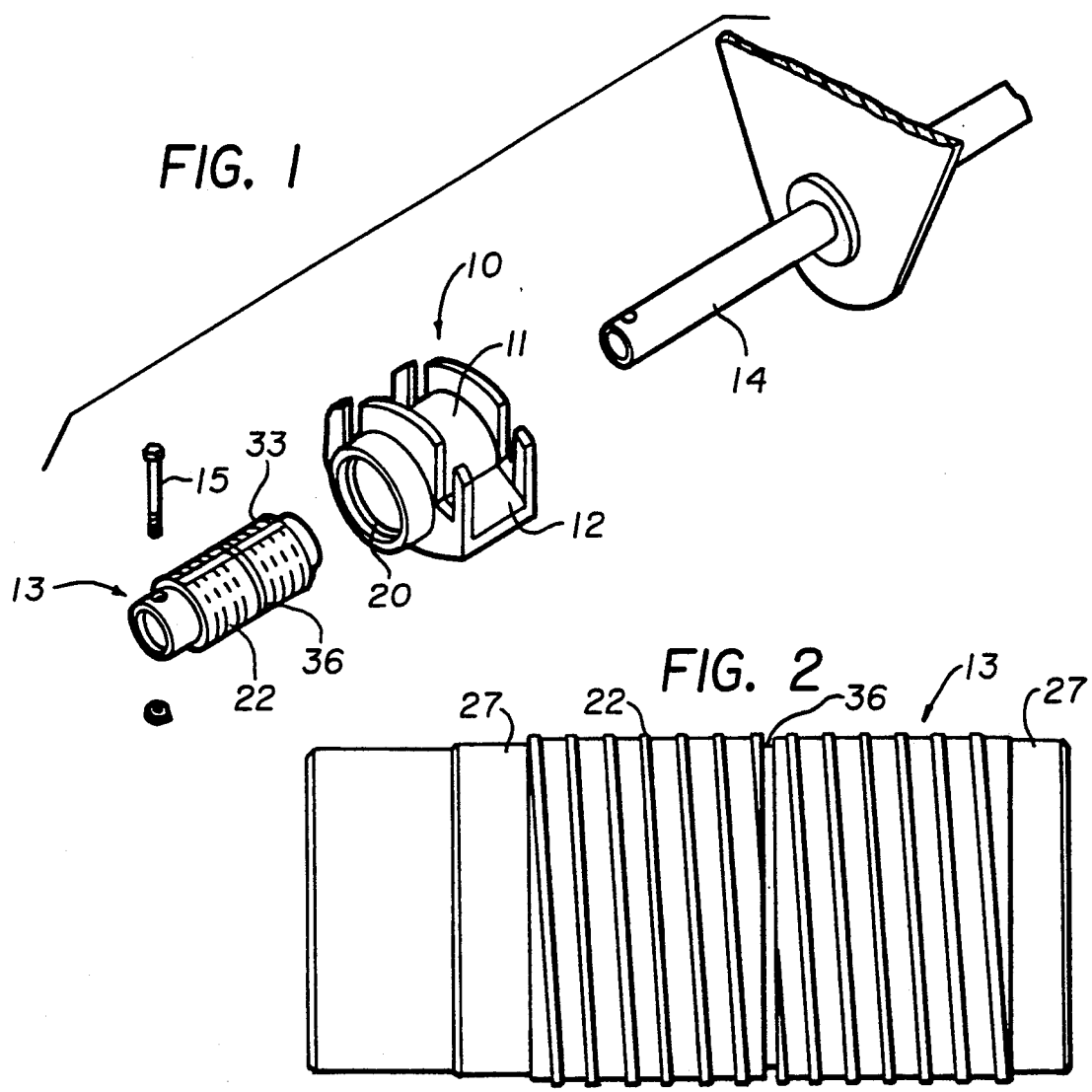
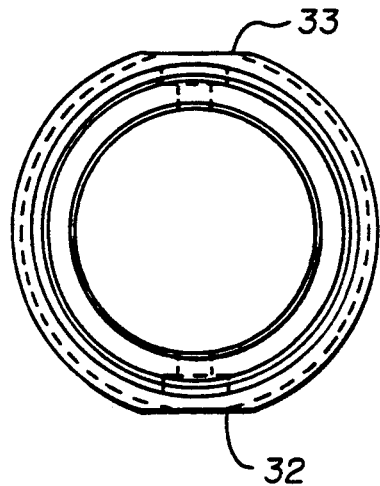
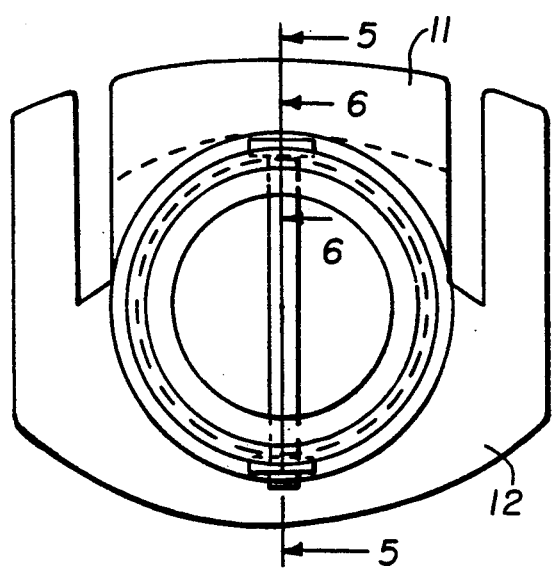

OSCILLATABLE BEARING ASSEMBLY

BACKGROUND OF THE INVENTION

1. Field of the Invention

This invention relates to bearings, especially for heavy loads such as found in truck spring suspension systems.

2. History of the Related Art

In a heavy-duty vehicle a trunnion connects its rear suspension to its chassis and accommodates suspension to chassis relative movement during normal suspension articulation. Bearing materials for trunnions generally employ either bronze on steel or rubber. The lives of such bearings are limited due to heavy unit loads carried, the absence of substantial resistance to end thrust, and the wear due to the relatively high friction inherent in the use of these materials.

SUMMARY OF THE INVENTION

It is an object of the invention to provide a bearing assembly for an oscillating bearing that provides for the circulation of lubricant between the bearing surfaces responsive to the oscillating motion.

It is a further object of the invention to provide an oscillatable bearing assembly of mating ductile iron surfaces that are permanently sealed and lubricated.

A still further object is to provide an oscillatable bearing assembly that provides substantially a 100% increase in bearing surface area per unit of length/diameter.

A still further object is to provide an oscillatable bearing assembly that provides for end thrust capacity equal to its normal loading capacity.

DESCRIPTION OF THE DRAWINGS

The foregoing and other objects of the invention will become apparent from the following description in conjunction with the accompanying drawings in which:

FIG. 1 is an exploded perspective illustration of one field of application of the invention;

FIG. 2 is an elevation of a bushing in accordance with the invention;

FIG. 3 is an end view of the bushing;

FIG. 4 is an end view of a bearing in accordance with the invention;

DESCRIPTION OF THE PREFERRED EMBODIMENT

Figure 5:
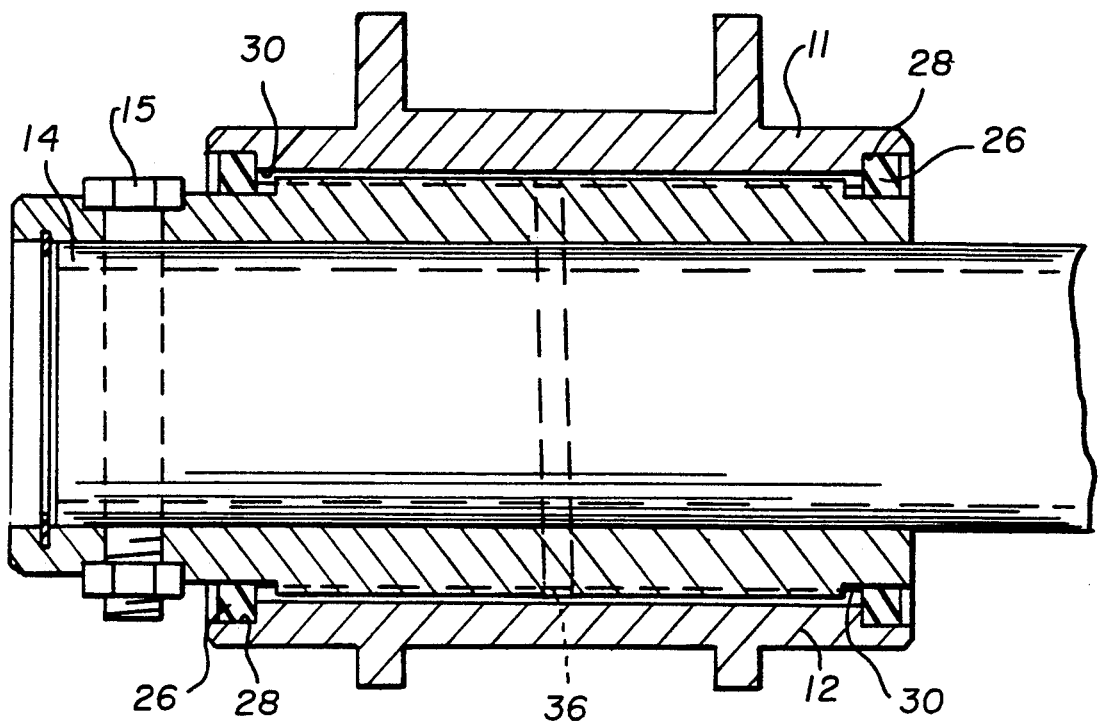
FIG. 5 is a longitudinal cross section on the line 5—5 of FIG. 4.

With further reference to the drawings, the bearing assembly of FIG. 1 is illustrated in association with a trunnion assembly of a type commonly used for heavy trucks, by way of example. This includes a housing 10 having upper and lower halves 11 and 12, forming respectively, a saddle for a leaf spring assembly, not shown, and a cap, and connected by bolts extended through flanges in the parts, not shown. The saddle portion 10 supports the vehicle chassis for limited articulated or oscillating motion on a bushing shaft 13 which is fixed to a stationary tube 14 in the vehicle's axle assembly by a bolt 15.

The adaptation for a heavy vehicle trunnion assembly is merely an illustration of a manner of use. The assembly is particularly adapted for any high load bearing that oscillates through a relatively small angle.

The bushing in a trunnion assembly, as previously stated, is commonly formed of rubber, a plastic, or bronze, with a resultantly short life span.

In the present invention the inner surface of the housing is provided with screw threads 20 for mating with screw threads 22 on the exterior of the bushing shaft 13.

While various size components and threads may be used, in the present example the housing threads 20 for a 5¼" 6 UN internal thread may have the following dimensions:

Pitch Diameter, min. 5.1417"; max. 5.1546"
Minor Diameter, min. 5.0696"; max. 5.0996"
Reference Major Diameter, 5.2500"

The threads 22 on the bushing shaft for the 6 UN 5¼" external thread may have the following dimensions:

Pitch Diameter, max. 5.1417"; min. 5.1318"
Major Diameter, max. 5.2500"; min. 5.2310"
Reference Minor Diameter, 5.0425"

In order to seal the ends of the bearing assembly a ring 26 is mounted on the reduced end portions 27 of the bushing shaft 13 and is received within the groove 28 of the housing. The ring may be of various materials and is preferably generally rectangular in section to enhance its sealing function. The reduced end portions extend inwardly beyond the grooves 28 to provide a recess or reservoir 30 for the lubricant at each end of the shaft 13.

Figure 6:
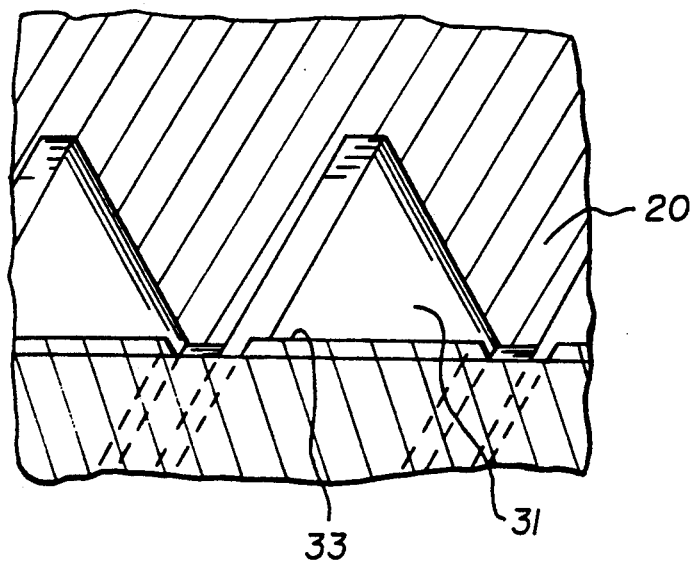
FIG. 6 is a section to an enlarged scale on the line 6—6 of FIG. 4.

In order to provide an additional lubricant reservoir 31, and also a collection zone for debris in the housing, a narrow longitudinal flat is formed in the bushing threads at the bottom, as indicated at 32, and preferably also at the top, as indicated at 33. This flat runs across the crest and sides of the helical threads substantially to the roots of the bushing threads 22, as indicated in FIGS. 1, 3 and 6.

Since the bearing shaft is of substantial length, in order to further insure that continuous lubrication will occur in all areas, a central groove 36 is provided midway of the bushing shaft as indicated in FIGS. 1, 2 and 5. This is formed by removing a band of material around the shaft approximately 0.200" wide and 0.100" deep, which is a depth slightly less than or approximately the same as one half the depth of its thread. The groove 36 may collect debris, similarly to the grooves 32 and 33. However, its primary function is to reduce the length of the threaded surfaces unrelieved pressure in order to insure against lubricant failure.

Prior to operation, the space between the threads is initially filled with lubricant. During operation the oscillating motion pumps the lubricant back and forth as the threads interengage. The seals 26 prevent loss of lubricant while the grooves 32, 33 and 36 accommodate any debris, thus reducing possible wear, and the groove 36 relieves the pressure along each helix to insure the even distribution of lubricant. An additional reservoir of lubricant is available from the spaces 36 at the ends.

Since the bearing surface is along mating thread surfaces, the bearing area for a given length of shaft is increased approximately 100%, thus reducing the unit bearing load proportionately. Furthermore, the mating threads provide for end thrust for load capacity which is not found or is substantially absent in a conventional bearing.

I claim:

1. An oscillatable bearing assembly, which provides a structure for the removal of debris created by the movement of parts of the assembly comprising a fixed bushing shaft having external screw threads along its length between first and second end portions, said external screw threads having upper and lower portions, an oscillatable housing having internal screw threads along its length between first and second end portions, said external and internal screw threads engaging in side-to-side relation with clearance and with their respective first and second end portions contiguous to each other, said bushing shaft having a first longitudinal flat along said lower portion of said screw threads extending from its first to its second end portions and forming a first reservoir for lubricant and debris interiorly of said housing, and sealing means between said bushing shaft and housing at the first and second end portions thereof, whereby a lubricant may be received between the external and internal screw threads and pumped along said screw threads between said sealing means to maintain lubrication therebetween while debris is accumulated in said first reservoir.

2. A bearing assembly as in claim 1, said bushing shaft having recesses inwardly of and proximate to said sealing means at each of said first and second end portions providing reservoirs for lubricant interiorly of said housing.

3. A bearing assembly as in claim 2, said bushing shaft having a circumferential groove intermediate its first and second end portions and providing a reservoir for lubricant and debris interiorly of said housing.

4. A bearing assembly as in claim 3, said bushing shaft having a second longitudinal flat along the upper portion of said threads extending from its first to its second ends, said second flat being spaced 180° around said bushing shaft from said first flat.

5. A bearing assembly as in claim 1, said bushing shaft having a second longitudinal flat along the upper portion of said threads extending from its first to its second ends, said second flat being spaced 180° around said bushing shaft from said first flat.

6. A bearing assembly as in claim 1, said bushing shaft having a circumferential groove intermediate its first and second end portions and providing a reservoir for lubricant and debris interiorly of said housing.

* * * * *